United States Patent [19]

Inoue et al.

[11] Patent Number: 4,546,464
[45] Date of Patent: Oct. 8, 1985

[54] METHOD OF MANUFACTURING AN OPTICAL RECORDING/REPRODUCING DISC

[75] Inventors: Takao Inoue; Yukio Maeda; Masami Uchida, all of Hirakata, Japan

[73] Assignee: Matsushita Electric Industrial Co., Ltd., Osaka, Japan

[21] Appl. No.: 548,891

[22] PCT Filed: Feb. 3, 1983

[86] PCT No.: PCT/JP83/00029
§ 371 Date: Oct. 4, 1983
§ 102(e) Date: Oct. 4, 1983

[87] PCT Pub. No.: WO83/02845
PCT Pub. Date: Aug. 18, 1983

[30] Foreign Application Priority Data

Feb. 5, 1982 [JP] Japan ............................ 57-17807
Feb. 10, 1982 [JP] Japan ............................ 57-20020

[51] Int. Cl.⁴ .................... G11B 19/02; B05D 1/38
[52] U.S. Cl. .................................. 369/280; 369/283; 369/286; 427/240
[58] Field of Search ............. 369/280, 283, 286, 289, 369/291; 346/135.1, 137; 427/240

[56] References Cited

U.S. PATENT DOCUMENTS

| 2,631,859 | 3/1953 | Ellsworth | 369/280 |
| 3,430,766 | 4/1967 | Gregg | 369/286 |
| 4,038,524 | 7/1977 | Puech et al. | 369/286 |
| 4,111,698 | 9/1978 | Sato | 427/240 |
| 4,113,492 | 9/1978 | Sato et al. | 427/240 |
| 4,175,145 | 11/1979 | Fetchet | 427/240 |
| 4,371,954 | 2/1983 | Cornet | 369/288 |

FOREIGN PATENT DOCUMENTS

| 29115 | of 1912 | United Kingdom | 369/291 |
| 473988 | 9/1937 | United Kingdom | 369/283 |

Primary Examiner—Steven L. Stephan
Attorney, Agent, or Firm—Wenderoth, Lind & Ponack

[57] ABSTRACT

An optical recording/reproducing disc is formed of round plastic plates between which is a recording layer capable of optically recording and reproducing signals, and a round protective layer of plastic material provided on the recording layer and having at the outer peripheral end a projection higher by 10 to 200μ than the inner peripheral surface of an effective recording/reproducing surface. Thus, when the disc is placed on a flat plane, a space is formed between the flat plane and the recording layer due to the projection, thereby preventing flaws from being produced by contact with dust or a foreign object.

4 Claims, 4 Drawing Figures

METHOD OF MANUFACTURING AN OPTICAL RECORDING/REPRODUCING DISC

TECHNICAL FIELD OF THE INVENTION

This invention relates to a method of manufacturing an optical recording/reproducing disc, and more particularly an optical recording/reproducing disc which is difficult to injure, and which is provided at the outer peripheral surface with a disc protecting layer to thereby protect a region for recording/reproducing signals.

BACKGROUND ART

Conventionaly, an optical recording disc has been formed by a round plastic plate having a recording layer capable of optically recording/reproducing and thereafter another plastic plate placed over the recording layer for protecting it. The protective plastic plate for the recording layer, however, has a problem in that the surface of the recording disc, when placed on a flat surface, is injured by contact with dust or foreign objects during manufacture. This has been a problem also with an optical recording/reproducing disc using a laser beam. In other words, a problem has been created in that the flaws on the protective plate will appear as noise during recording and/or reproducing of signals.

SUMMARY OF THE INVENTION

An optical recording/reproducing disc according to the invention comprises a round plastic plast, a recording layer provided on the plastic plate and enabling optical recording and/or reproducing, and a round protective layer of plastic material provided on the recording layer and having at the outer peripheral end a projection higher by 10 to 200$\mu$ than the inner peripheral surface at the effective recording/reproducing surface, thereby to protect the recording layer, so that when the disc is placed on a flat surface the projection of the protective layer forms a space between the recording layer and the flat surface, thereby preventing flaws from being produced by contact with dust or a foreign object.

BEST MODE FOR CARRYING OUT THE INVENTION

Figure 1:
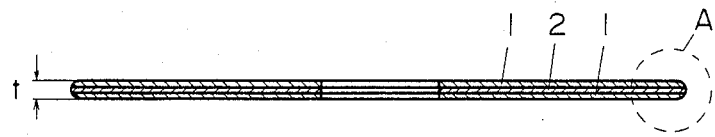
FIG. 1 is a sectional side view of an embodiment of an optical recording/reproducing disc manufactured according to the method of the invention.

The optical recording/reproducing disc base member of the invention, as shown in FIG. 1, mainly comprises three layers. Namely, a recording layer 2 necessary for optical recording and/or reproducing is interposed between two plastic plates 1 of acrylic resin each having a center bore and a diameter of 210 mm. In further detail, the recording layer 2 utilizes the principle that irradiation by a laser beam causes a phase transition to change the reflectivity of the layer.

Figure 2:
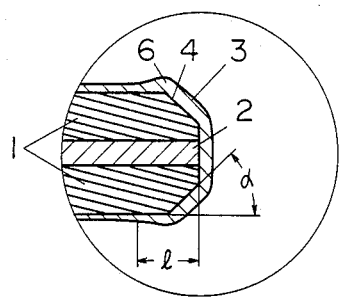
FIGS. 2, 3 and 4 are partially sectional views of outer peripheral end portions of the embodiment of FIG. 1 and of modified embodiments manufactured according to the method of the invention.
Figure 3:
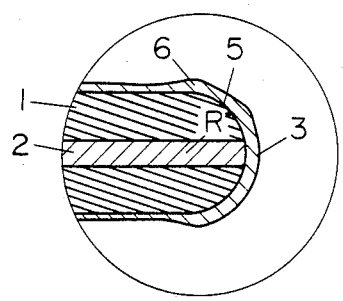
Figure 4:
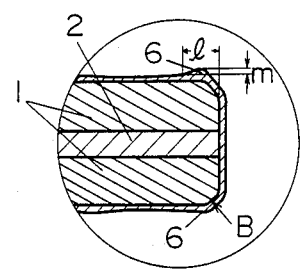

FIGS. 2 and 3 are partially enlarged sectional views of a portion designated by A in FIG. 1, and each shows the disc in FIG. 1 coated with a protective layer 3. The disc in FIG. 2 is chamfered as at 4 at the corners of the outer peripheral end portion of disc, and the disc in FIG. 3 is rounded-chamfered at the same portion. A projection 6 is provided at the outermost periphery of each disc. In FIG. 4, the projection 6 of the protective layer 3 provided at the outermost peripheral end of the disc comprising the plastic plates 1 and recording layer 2 preferably has a height m as large as possible. However, when height m becomes too large, the area of projection 6 and width 1 thereof are increased, resulting in a poor appearance. Thus, the projection 6 preferably has a height of about 200$\mu$ or less from the viewpoint of the positional relation with the laser head. However, a height of 10$\mu$ or less has not been effective in prevention of flaws caused by dust or the like. The embodiment in FIG. 4 is obtained by a coating operation wherein a coating liquid is filled in a dip tank, and the coating material is applied simultaneously to both surfaces of the resin disc by rotating the disc by a rotary shaft, thereby simultaneously forming the protective layer 3 and projection 6.

The coating apparatus and method used for this embodiment provide for a constant number of rotations during dipping: 50 rpm, during spinning: 2000 rpm, and during irradiation by ultraviolet rays: 750 rpm.

In addition, the coating material comprises 100 parts by weight of a composition consisting of 40 parts by weight of dipentaerythritol-hexacrylate, 10 parts by weight of epoxyacrylate, 60 parts by weight of trimethylol-propanetriacrylate, and 10 parts by weight of hydroxyethylmethacrylate, and added with 3 parts by weight of benzoinisobutyl ether, which composition is mixed with isopropyl alcohol and methyl isobutyl ketone to form a solvent of viscosity of 16 cps (at 25° C.).

After experiments under the above conditions and with an angle $\alpha$ of chamfer and radius $\overline{R}$ of roundness of chamfer, the results in Tables 1 and 2 were obtained.

When the angle $\alpha$ was larger than 60°, the width l of the thick portion of film increased, and in a case of no chamfering, a width l of over 1 cm appeared. Hence, the angle $\alpha$ of chamfer preferably is 60° or less, further preferably 5° to 45°. The angle of 5°, not to say absolutely from the relation to the recording region, should be defined by a chamfer surface not reaching the recording layer 2. Also, in FIG. 2, the chamfered portion may be round.

In FIG. 3, the end portion of disc is chamfered semi-circularly, in which case radius R is $\frac{1}{3}$ to 4/5, preferably $\frac{1}{2}$ to 3/5, as large as the disc thickness.

In FIG. 4, the angle of chamfer is changed from 10° to 80° and the coating solvent viscosity from 5 to 30 cps (by B type viscometer at 20° C.), so that the disc was obtained which of the desired dimensions shown in Table 3.

The effect of preventing flaws was discriminated in such a manner that sand of particle size of 300$\mu$ or less was scattered on a base on which the disc was reciprocated 10 times under its weight, and resultant flaws formed on the disc were inspected by a depth gage and visual observation. The discrimination or classification of the flaws is as follows (A, B and C practicable):
A: non flaw,
B: several slight flaws (not affecting signals),
C: several deep flaws (affecting signals according to the location of flaw),
D: innumerable slight flaws,
E: innumerable deep flaws, and
F: other defects (such as appearance).

TABLE 1

|  | Angle α of Chamfer | l (mm) | Percent Defective in Production of 50 Discs |
|---|---|---|---|
| Comparison Example | 80 (degree) | 1.5 | 4 (%) |
| Embodiment 1 | 60 | 1.0 | 0 |
| Embodiment 2 | 45 | 0.7 | 0 |
| Embodiment 3 | 5 | 1.3 | 1 |
| Comparison Example | 0 | 2.0 | 6 |

(A disc incapable of recording and reproducing signals at the outermost periphery was determined to be defective).

Table 2

|  | Radius of Round Chamfer R = n × t | l (mm) | Percent Defective in Production of 50 Discs (%) |
|---|---|---|---|
| Comparison Example | n = 0 | 2.0 | 6 |
| Embodiment 1 | n = 4/5 | 1.0 | 0 |
| Embodiment 2 | n = 3/5 | 0.5 | 0 |
| Embodiment 3 | n = ½ | 0.5 | 0 |

(Disc Substrate: Acrylic plate of 210 in diameter).
(A disc incapable of recording and reproducing signals at the outermost periphery was determined to be defective).

TABLE 3

| Item Example | Shape (Dimension) m (μm) | l (mm) | Discrimination |
|---|---|---|---|
| Embodiment 1 | — 5 | 2~3 | E: Innumerable flaws |
| Embodiment 2 | 10 | 1~2 | C: Several flaws |
| Embodiment 3 | 200 | 1 | C: Several flaws, Slightly poor appearance |
| Embodiment 4 | 300 | 1~2 | F: Poor configuration of projection, Poor appearance |
| Embodiment 5 | 20 | 1 | B: Several slight flaws |
| Embodiment 6 | 50 | 0.7 | A: Non flaw |
| Embodiment 7 | 100 | 0.9 | A: Non flaw |
| Comparison Example | 0 | 0 | D: Innumerable slight flaws |

From the above results, a projection of 10 to 200μ in height is provided at the outermost periphery of the disc, thereby making it possible to provide a practical disc having recording and reproducing regions which are difficult to injure.

INDUSTRIAL APPLICABILITY

As seen from the above, the optical recording/reproducing disc of the invention, even when placed on the flat plane, is difficult to injure, due to the projection formed in the protective layer at the outermost peripheral end of the disc, thereby being not only convenient to operate but also available for storing signals.

What is claimed is:

1. A method of manufacturing an optical recording-/reproducing disc, said method comprising:
   fixing plastic plates to opposite sides of a recording layer capable of permitting optical recording and reproducing of signals;
   providing each said plate with an outer peripheral conical surface chamfered radially inwardly and axially away from said recording layer at an angle of 5° to 60° to the plane of said disc;
   applying a solution of plastic material over opposite outer surfaces of said plates, said chamfered peripheral surfaces thereof, and the outer peripheral surface of said recording layer by a spin coating operation involving rotating said disc about the axis thereof;
   by said spin coating operation forming from said solution respective integral annular projections extending axially outwardly from respective sides of said disc at locations adjacent radially inner portions of respective said chamfered surfaces; and
   while rotating said disc about said axis causing said solution to set, thereby forming a protective coating having extending axially therefrom said annular projections.

2. A method as claimed in claim 1, comprising forming said projections to have an axial height of 10 to 200μ.

3. A method of manufacturing an optical recording-/reproducing disc, said method comprising:
   fixing plastic plates to opposite sides of a recording layer capable of permitting optical recording and reproducing of signals;
   providing each said plate with an outer peripheral rounded surface chamfered radially inwardly and axially away from said recording layer and having a radius of curvature equal to ½ to 4/5 the thickness of said disc;
   applying a solution of plastic material over opposite outer surfaces of said plates, said chamfered peripheral surfaces thereof, and the outer peripheral surface of said recording layer by a spin coating operation involving rotating said disc about the axis thereof;
   by said spin coating operation forming from said solution respective integral annular projections extending axially outwardly from respective sides of said disc at locations adjacent radially inner portions of respective said chamfered surfaces; and
   while rotating said disc about said axis causing said solution to set, thereby forming a protective coating having extending axially therefrom said annular projections.

4. A method as claimed in claim 3, comprising forming said projections to have an axial height of 10 to 200μ.

* * * * *